UNITED STATES PATENT OFFICE.

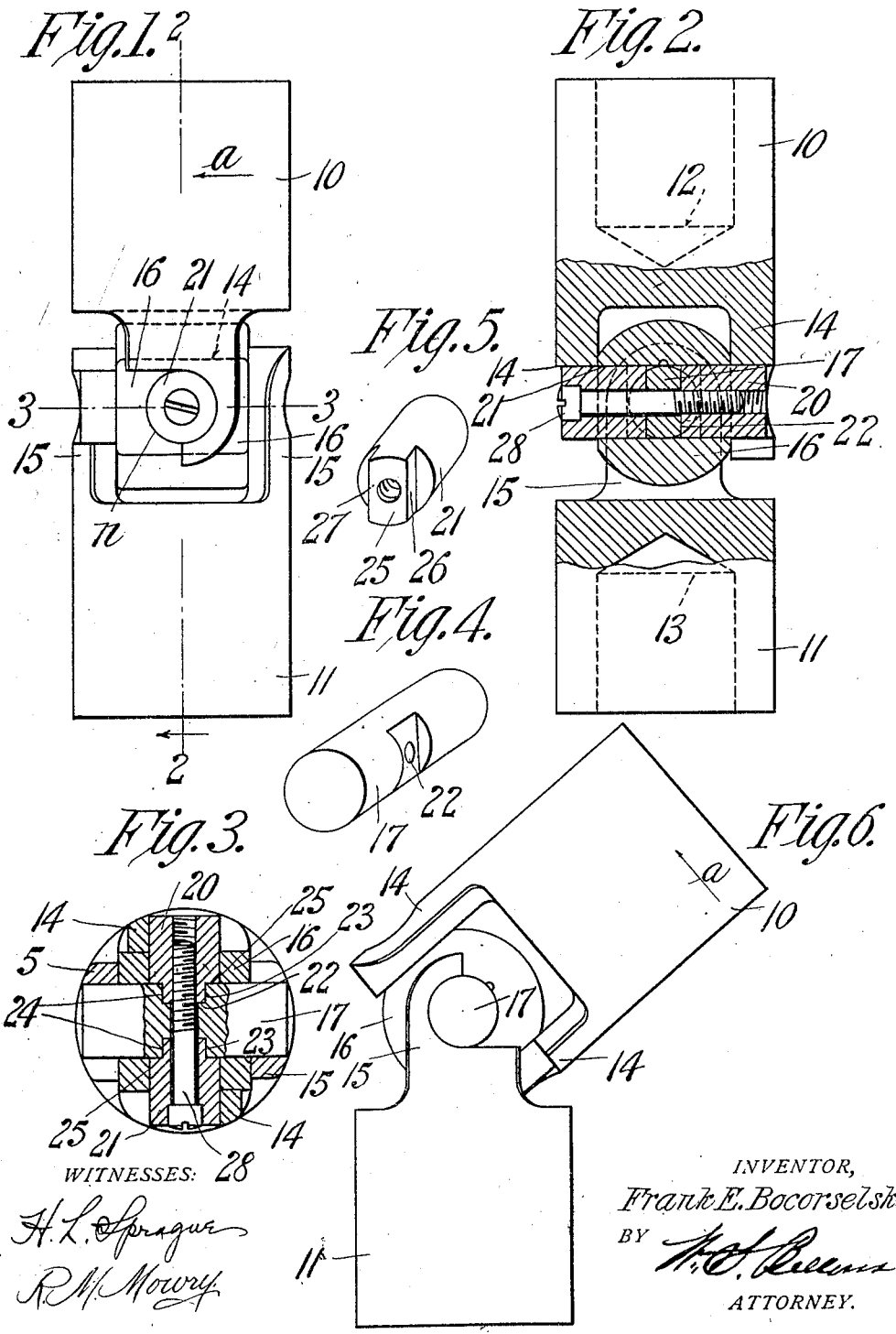

FRANK E. BOCORSELSKI, OF SPRINGFIELD, MASSACHUSETTS.

UNIVERSAL JOINT.

1,020,476.       Specification of Letters Patent.    Patented Mar. 19, 1912.

Application filed August 4, 1910. Serial No. 575,478.

*To all whom it may concern:*

Be it known that I, FRANK E. BOCORSELSKI, a citizen of the United States of America, and resident of Springfield, in the county of Hampden and State of Massachusetts, have invented certain new and useful Improvements in Universal Joints, of which the following is a full, clear, and exact description.

This invention relates to universal joints for coupling the ends of a pair of coöperative unalined shafts, and it has for one of its objects the provision of a device of this character in which a minimum number of parts are employed and which is adapted to transmit a proportionally great amount of power.

The invention has, furthermore, for its object such construction of the device, above referred to, whereby the life thereof will be substantially doubled by virtue of the fact that the parts most exposed to wear may be reversed so that after one side thereof has been worn, the other side may be brought in conjunction with its coöperative element.

Further objects of the invention will hereinafter appear and the means of their attainment be pointed out in the claims.

Referring to the drawings in which similar characters denote similar parts Figure 1 is a side view of a universal joint embodying my invention. Fig. 2 is a vertical section thereof on line 2, 2 of Fig. 1. Fig. 3 is a horizontal section on line 3, 3 of Fig. 1. Fig. 4 shows a perspective view of the principal pivot-pin of the device. Fig. 5 shows a perspective view of one of the trunnions coöperative with and united to said pivot pin, and Fig. 6 illustrates the universal joint in its unalined or broken position.

Referring to the drawings, the numerals 10 and 11 denote a pair of coupling members which are bored out as at 12 and 13 to receive the ends of shafts which the joint is intended to unite.

The coupling members or shaft sections 10 and 11 are substantially similar each having its ends bifurcated and comprising pairs of arms 14 and 15, respectively, adapted to straddle each other at right angles and to receive between them the transmission block as such member is usually termed in this class of devices. This member consists in the present instance of a block 16 of such size as to fit closely between the jaw pairs 14 and also between the jaw pairs 15 (see Fig. 3), and it carries the devices whereby these jaw-sections may be supported for turning or pivot movement so as to adapt themselves to the rotations of the shaft sections.

In the present instance, the pivot members, for the jaw, respectively, consist of a pivot pin 17 extending through the block 16 at opposite sides thereof far enough so as to be engaged by the jaws 15 which, however, are in engagement or surface contact with said pin only for substantially one-half of the peripheral surface thereof, as clearly indicated in Figs. 1, 3 and 6.

Means are provided for connecting the pivot pin 17 with the block 16 in such manner that it may be adjustably turned for half a rotation, and at the same time preventing said pin from longitudinal movement therein, these means consisting of trunnion forming blocks 20, 21 constructed alike and substantially as shown in Fig. 5, and adapted to form a rigid joint with the pivot pin 17, as shown in Fig. 3, in which it will be seen that the pivot pin 17 is slabbed having cut-away portions near its longitudinal center and at diametrically opposite sides so as to form recesses 22 bounded by straight walls 23, 24 disposed at proper distance apart to receive between them the correspondingly shaped or tenon like ends 25 of the trunnions 20 and 21, said reduced portions 25 being bounded by a pair of parallel faces 26 and 27 (see Fig. 5), so that the trunnion blocks 20, 21, may be assembled in connection with the pivot pin 17, either side up, and when thus assembled, said trunnion blocks are firmly drawn together and into their respective recesses in the pivot pin 17 by means of a screw 28 (see Fig. 3).

The screw has a head within a countersink in the bore of the trunnion block 21, a portion of its shank loosely passing through the bore in such block, while its screw extremity screw-engages in the tapped bore in the opposite trunnion block 20.

From the foregoing, it will be understood that the trunnion blocks are, as a matter of fact, reversible, so that when the one-half periphery of the trunnion 21 shall have been worn by virtue of its contact with the jaw 14, to some appreciable extent, the trunnion 21 itself may at first be pulled out of its recess in the pivot-pin 17 and then turned half way around so as to bring the new surface n thereof into engagement with the jaw 14, while the opposite worn surface of said trunnion will then occupy the position occupied by the surface n shown in Fig. 1. It is, therefore, evident that by virtue of this reversibility, the life of the universal joint as a whole and as far as it depends upon the trunnions, will be doubled, as compared with the older types of devices used heretofore.

By reason of the interengagement of the several parts, that is the inner faces of the jaws of the shaft sections with opposite sides of the transmission block and the oppositely-opening recessed portions of pairs of the jaws with the trunnions constituted by the outwardly projecting ends of the pivot pin and of the trunnion blocks, this universal joint is as stable in the maintained relation of its parts and for power transmission without back lash or lost motion when the shaft sections are reversely rotated as it is when the sections are forwardly rotated.

I claim:—

A universal joint comprising shaft sections, each having a pair of opposed jaws, those of one section being arranged at right angles to those of the other, and the jaws of each pair having partially circular trunnion receiving sockets, with the openings thereinto oppositely disposed, a transmission block, the sides of which are at right angles to each other being embraced by both pair of said jaws, and having bores extending therethrough at right angles to each other and terminating at their jaw-embraced sides, a pivot pin extending through one of the bores of the transmission block, having its ends projecting beyond the opposite faces of such block to form trunnions engaging in the partially circular recesses of one pair of the jaws, said pin having opposite recesses in the middle portion thereof which is within the transmission block, a pair of trunnion blocks which the other pair of partially circularly recessed jaws engage, entered into the other bore of the transmission block, and having tenon like projections at their inner ends, in engagement in the said opposite recesses in the middle of the pivot pin, and a headed screw, the shank of which is loosely extended through one of the trunnion blocks, and has a screw engagement with the other trunnion block.

Signed by me at Springfield, Mass., in presence of two subscribing witnesses.

FRANK E. BOCORSELSKI.

Witnesses:
 WM. S. BELLOWS,
 H. L. SPRAGUE.